(12) United States Patent
Christiansen et al.

(10) Patent No.: US 9,116,904 B2
(45) Date of Patent: Aug. 25, 2015

(54) FILE SYSTEM OPERATION ON MULTI-TIERED VOLUME

(71) Applicant: Microsoft Corporation, Redmond, WA (US)

(72) Inventors: Neal Robert Christiansen, Bellevue, WA (US); Daniel Chan, Redmond, WA (US); Rajsekhar Das, Kirkland, WA (US); Juan-Lee Pang, Redmond, WA (US); Malcolm James Smith, Bellevue, WA (US); Andrew Herron, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 165 days.

(21) Appl. No.: 13/829,314

(22) Filed: Mar. 14, 2013

(65) Prior Publication Data

US 2014/0280392 A1    Sep. 18, 2014

(51) Int. Cl.
G06F 17/30    (2006.01)
(52) U.S. Cl.
CPC ............................... G06F 17/30115 (2013.01)
(58) Field of Classification Search
CPC ................. G06F 17/30067; G06F 17/30011
USPC ....................................................... 707/822
See application file for complete search history.

(56) References Cited

U.S. PATENT DOCUMENTS

| | | | |
|---|---|---|---|
| 5,287,500 A | 2/1994 | Stoppani, Jr. | |
| 7,441,096 B2 | 10/2008 | Kitamura | |
| 7,640,274 B2 | 12/2009 | Tinker et al. | |
| 8,051,243 B2 | 11/2011 | Murase | |
| 8,229,897 B2 | 7/2012 | Cannon et al. | |
| 8,271,757 B1 | 9/2012 | Chatterjee et al. | |
| 8,285,758 B1 | 10/2012 | Bono et al. | |
| 8,290,972 B1 | 10/2012 | Deshmukh et al. | |
| 8,352,429 B1 | 1/2013 | Mamidi et al. | |
| 8,356,147 B2 * | 1/2013 | Kawaguchi | 711/157 |
| 8,566,546 B1 | 10/2013 | Marshak | |
| 8,583,838 B1 | 11/2013 | Marshak et al. | |

(Continued)

FOREIGN PATENT DOCUMENTS

WO    WO 2009102425 A1    8/2009

OTHER PUBLICATIONS

"Content Management without Boundaries", Published on: Aug. 7, 2011, Available at: http://www.oracle.com/us/products/servers-storage/storage/tape-storage/oracle-br-ecm-storage-209502.pdf.

(Continued)

*Primary Examiner* — Rehana Perveen
*Assistant Examiner* — Dongming Wang
(74) *Attorney, Agent, or Firm* — Sunah Lee; Raghu Chinagudabha; Micky Minhas

(57) ABSTRACT

A file system that operates on an underlying volume that has multiple tiers, each tier including a particular trait set. Upon creating or otherwise identifying a file system namespace (such as a directory or file) that is in a volume or that is to be included within the volume, a storage trait set to be applied corresponding to the file system namespace is identified. Then, the storage trait set is compared against the trait sets for the multiple tiers to identify a tier into which to store the file system namespace. The file system namespace is then caused to be stored within the identified tier. Thus, the file system is provided with a volume that has multiple tiers (each having different trait sets) to choose from in storing files.

22 Claims, 6 Drawing Sheets

(56) References Cited

U.S. PATENT DOCUMENTS

| | | | |
|---|---|---|---|
| 8,639,665 B2 * | 1/2014 | Berman et al. | 707/651 |
| 8,732,217 B2 * | 5/2014 | Mamidi et al. | 707/821 |
| 8,868,797 B1 | 10/2014 | Kirac et al. | |
| 8,874,850 B1 | 10/2014 | Goodson et al. | |
| 2006/0010169 A1 | 1/2006 | Kitamura | |
| 2007/0038749 A1 | 2/2007 | Noya et al. | |
| 2007/0185934 A1 | 8/2007 | Cannon et al. | |
| 2008/0177948 A1 | 7/2008 | Mimatsu | |
| 2009/0077097 A1 * | 3/2009 | Lacapra et al. | 707/10 |
| 2009/0157756 A1 | 6/2009 | Sanvido | |
| 2010/0332452 A1 | 12/2010 | Hsu et al. | |
| 2011/0072225 A1 | 3/2011 | Kawaguchi et al. | |
| 2011/0106863 A1 | 5/2011 | Mamidi et al. | |
| 2011/0231631 A1 | 9/2011 | Matsuzawa et al. | |
| 2012/0011329 A1 | 1/2012 | Nonaka | |
| 2012/0047346 A1 | 2/2012 | Kawaguchi | |
| 2012/0290779 A1 | 11/2012 | Eleftheriou et al. | |
| 2012/0303929 A1 | 11/2012 | Chiu et al. | |
| 2013/0024650 A1 | 1/2013 | Ambat et al. | |
| 2013/0036280 A1 | 2/2013 | Futawatari et al. | |
| 2013/0054932 A1 | 2/2013 | Acharya et al. | |
| 2013/0073821 A1 | 3/2013 | Flynn et al. | |
| 2013/0238867 A1 | 9/2013 | Hayashi | |
| 2014/0297909 A1 | 10/2014 | Aiura et al. | |

OTHER PUBLICATIONS

"Enabling the Virtual Data Center", Published on: Aug. 27, 2010, Available at: http://i.dell.com/sites/content/business/smb/sb360/en/Documents/wp-enabling-dc.pdf.

Simpson, Dave, "Isilon Puts Multiple Tiers under One File System", Published on: Jun. 29, 2010, Available at: http://www.infostor.com/index/articles/display/2125168308/articles/infostor/nas/2010/june-2010/isilon-puts_multiple.html.

U.S. Appl. No. 13/829,276, Rajpal, et al., "Heterogenic Volume Generation and Use System", Filed Date: Mar. 14, 2013.

U.S. Appl. No. 13/829,276, filed Mar. 14, 2013, Rajpal et al.

U.S. Appl. No. 13/829,245, filed Mar. 14, 2013, Rajpal et al.

U.S. Appl. No. 13/829,363, filed Mar. 14, 2013, Herron et al.

"International Search Report & Written Opinion for PCT Patent Application No. PCT/US2014/023599", Mailed Date: Jun. 25, 2014, Filed Date: Mar. 11, 2014, 8 Pages.

"Infinity Storage", Published on: Jul. 13, 2012, Available at: http://www.infinity-storage.com/product-overview.html.

"Veritas Storage Foundation™ Intelligent Storage Provisioning Solutions Guide", Published on: Jan. 23, 2007, Available at: http://sfdoccentral.symantec.com/sf/5.0/hpux/pdf/sf_isp_solutions.pdf.

"Automated Storage Tiering", In White Paper of Point Software & Systems Gmbh, Retrieved on: Apr. 11, 2013, 16 pages.

"International Search Report & Written Opinion for PCT Patent Application No. PCT/US2014/023366", Mailed Date: Jun. 24, 2014, Filed Date: Mar. 11, 2014, 8 Pages.

"International Search Report & Written Opinion for PCT Patent Application No. PCT/US2014/023219", Mailed Date: Jun. 26, 2014, Filed Date: Mar. 11, 2014, 8 Pages.

International Search Report & Written Opinion for PCT Patent Application No. PCT/US2014/023315, Mailed Date: Nov. 25, 2014, Filed Date: Mar. 11, 2014, 9 pages.

Office Action dated Dec. 15, 2014 cited in U.S. Appl. No. 13/829,363.

Office Action dated Nov. 28, 2014 cited in U.S. Appl. No. 13/829,276.

Office Action dated Jan. 30, 2015 cited in U.S. Appl. No. 13/829,245.

Office Action dated May 1, 2015 cited in U.S. Appl. No. 13/829,363.

Office Action dated May 7, 2015 cited in U.S. Appl. No. 13/829,276.

Notice of Allowance dated May 18, 2015 cited in U.S. Appl. No. 13/829,245.

* cited by examiner

FILE SYSTEM OPERATION ON MULTI-TIERED VOLUME

BACKGROUND

Computing systems obtain a high degree of functionality by executing software programs. Computing systems use storage hierarchies in order to store such software programs and other files. At the lowest level of a local storage hierarchy might be a disk, such as a mechanical disk, optical disk and the like. Higher up in the storage hierarchy might be devices such as solid-state disks or non-volatile memory and the like.

Computing systems operate most efficiently when the most in demand blocks of data are located high in the storage hierarchy, wherein the lesser demanded blocks of data might be located lower in the storage hierarchy. The decision on where to place blocks of data within the storage hierarchy conventionally takes place below the file system.

The file system itself typically has no visibility on this storage hierarchy, but instead views storage in the form of a volume. A volume is a single logical namespace visible to the file system. A volume may be provisioned to be a certain size and often corresponds to the boundaries of an underlying storage device. For instance, a disk may be a single volume, or perhaps be partitioned into multiple volumes. Furthermore, a volume may be made of multiple disks. The file system may then structure directories within the volume, and save files into the namespace, either at the root directory of the namespace, or within one of the directories of the namespaces.

A single volume may have particular traits. For instance, a volume might be set up to be mirrored and thus have a certain level of built-in redundancy. A volume might also be set up to be encrypted or compressed. Conventionally, the traits are set up on a per-volume basis. Thus, the file system itself views any block of storage within that volume to have the same traits as any other block of storage within that volume, and relegates any decisions regarding how blocks are placed to the storage system that is abstracted from the file system view.

BRIEF SUMMARY

At least some embodiments described herein relate to a file system that operates on an underlying volume that has multiple tiers, each tier including a particular trait set. Upon creating a file system namespace (such as a directory or file) that is to be placed in the volume, or otherwise identifying a file system namespace that is in a volume, a storage trait set to be applied corresponding to the file system namespace is identified. Then, the storage trait set is compared against the trait sets for the multiple tiers to identify a tier into which to store the file system namespace. The file system namespace is then caused to be stored within the identified tier. Thus, the file system is provided with a volume that has multiple tiers (each having different trait sets) to choose from in storing files.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

In accordance with embodiments described herein, a file system operates on an underlying volume that has multiple tiers, each tier including a particular trait set. Upon creating a file system namespace (such as a directory or file), or otherwise identifying a file system namespace already within a volume, a storage trait set to be applied corresponding to the file system namespace is identified. Then, the storage trait set is compared against the trait sets for the multiple tiers of the volume to identify a tier into which to store the file system namespace. The file system namespace is then caused to be stored within the identified tier in the volume. Thus, the file system is provided with a volume that has multiple tiers (each having different trait sets) to choose from in storing files.

Some introductory discussion of a computing system will be described with respect to FIG. 1. Then, the principles of how a volume might be created with multiple tiers, each having different traits, will be described with respect to FIGS. 2 and 3. Finally, embodiments of the operation of a file system that operates on that volume will be described with respect to FIGS. 4 and 5.

Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. The memory may take any form and may depend on the nature and form of the computing system. A computing system may be distributed over a network environment and may include multiple constituent computing systems.

Figure 1:
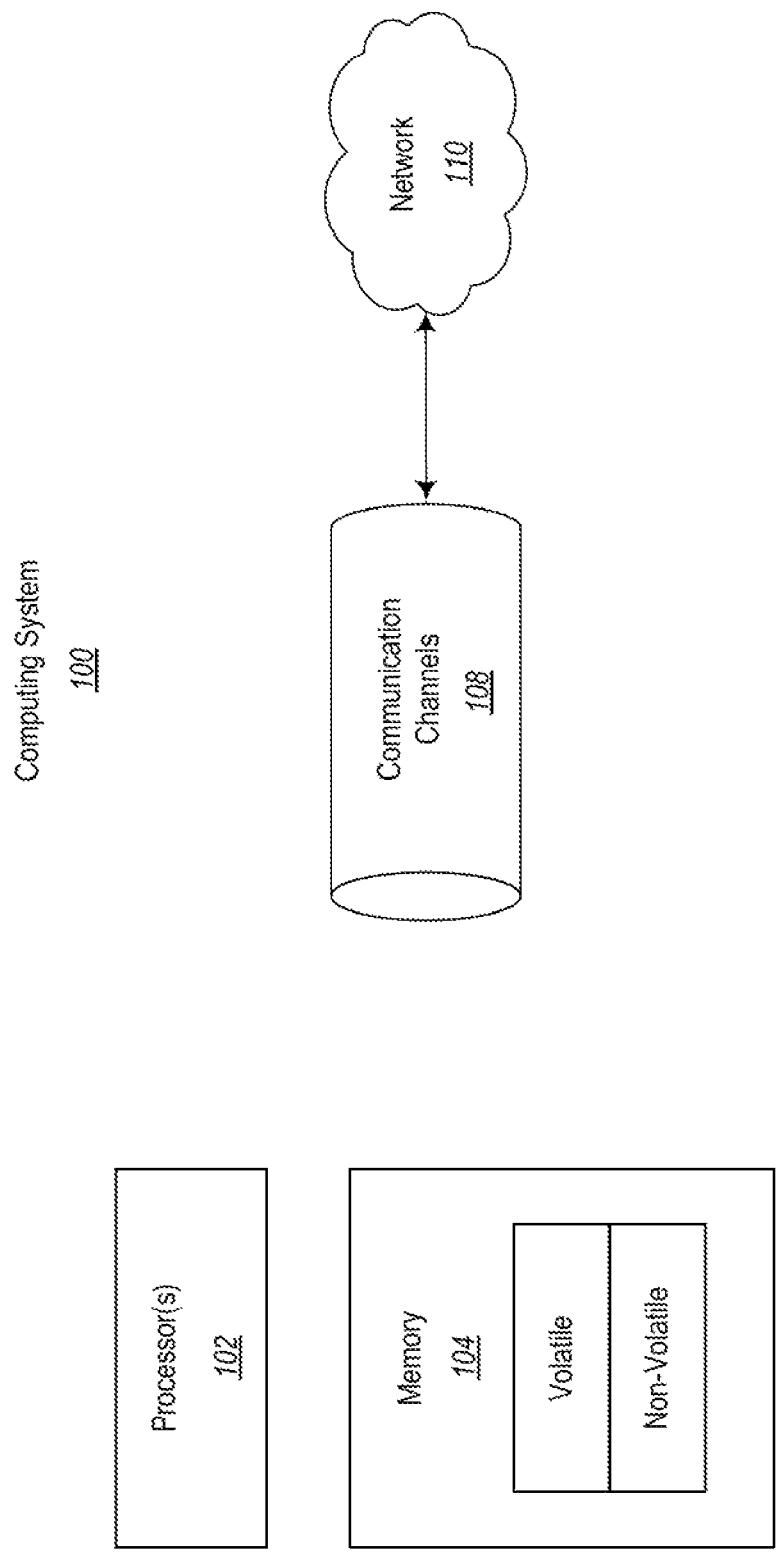
FIG. 1 abstractly illustrates a computing system in which some embodiments described herein may be employed.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "executable module" or "executable component" can refer to software objects, routings, or methods that may be executed on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. For example, such computer-executable instructions may be embodied on one or more computer-readable media that form a computer program product. An example of such an operation involves the manipulation of data. The computer-executable instructions (and the manipulated data) may be stored in the memory 104 of the computing system 100. Computing system 100 may also contain communication channels 108 that allow the computing system 100 to communicate with other message processors over, for example, network 110.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other tangible medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The principles of an example mechanism for exposing a volume that has multiple tiers of different storage traits to the file system will be described with respect to FIGS. 2 and 3. However, the broader principles of file system operation apply regardless of how the heterogenic volume (i.e., a volume having multiple tiers of different storage traits) is created. Thereafter, the embodiments of the operation of a file system that operates on that heterogenic volume will be described with respect to FIGS. 4 and 5. The embodiments of file system operation of FIGS. 4 and 5 will be described with respect to the volumes exposed in FIGS. 2 and 3, though the principles are not limited this mechanism for generating the volume.

Figure 2:
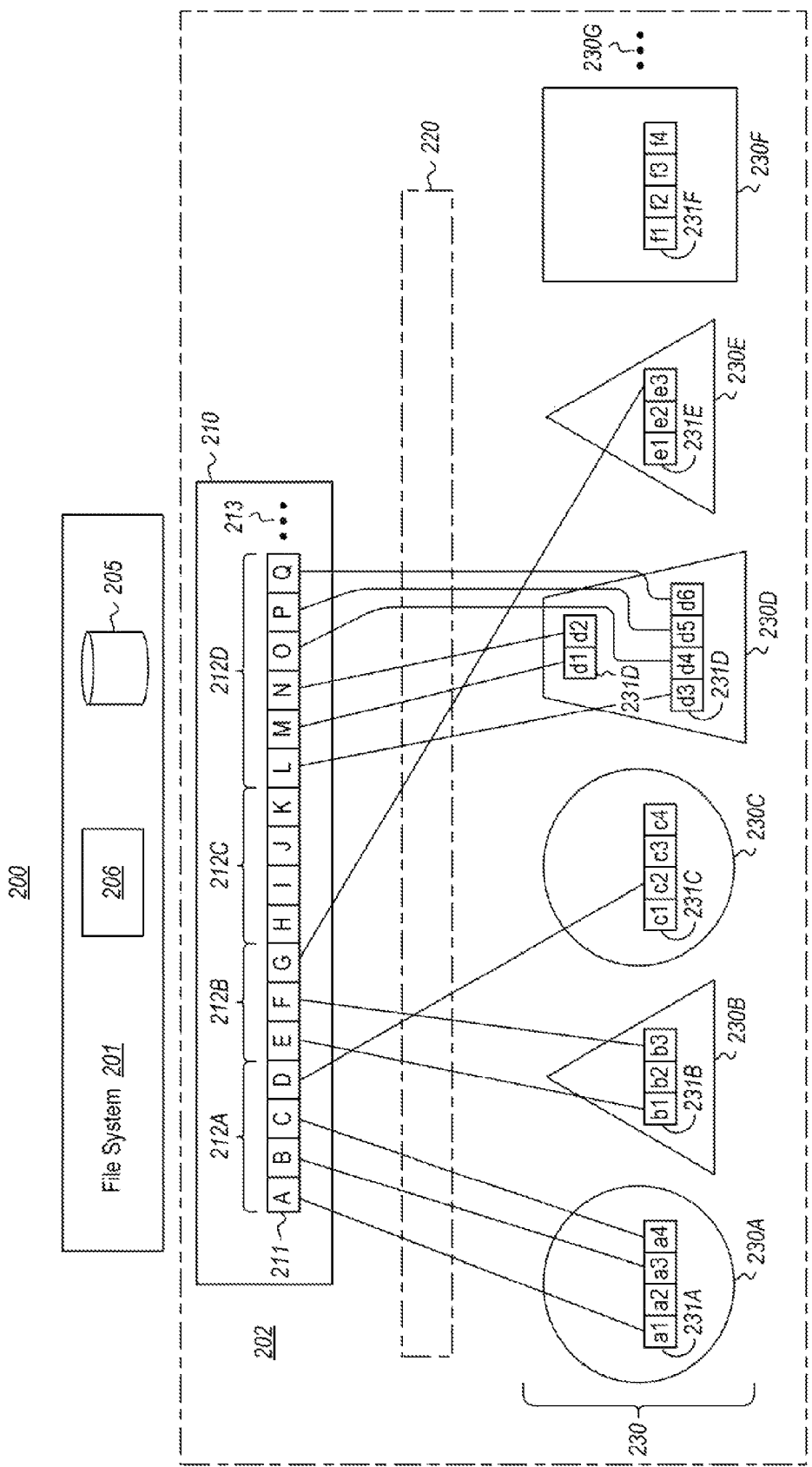
FIG. 2 illustrates a computing environment in which a volume system uses a volume exposure system to expose a volume up to a file system, the volume having multiple tiers of storage having different traits.

FIG. 2 illustrates a computing environment 200 in which a volume system 202 uses a volume exposure system 210 to expose a volume 211 up to a file system 201. The computing environment 200 may be, for example, implemented in the computing system 100 of FIG. 1. If that is the case, the file system 201 and the volume system 202 may be created and/or operated in response to the processor(s) 102 of the computing system executing computer-executable instructions. For instance, such computer-executable instructions may be stored on a computer-readable media, such as a computer-readable storage media that are included within a computer program product.

The volume 211 consists of storage represented in the form of an extent of preferably contiguous logical addresses. In this description and in the claims, a "volume" is defined as any group of one or more logical address extents that is presented to a file system in the form of a single namespace. When the file system 201 issues a read or write request to the volume system 202, the file system request includes a logical address. The volume system 202 is configured to recognize the part of the volume 211 that is being addressed using the logical address provided by the file system 201. Thus, from the file system 201 point of view, the file system 201 has access to the entire volume 211 logically addressable throughout the entire extent of the volume 211.

However, unlike a conventional volume, not all storage locations in the volume 211 have the same traits. Thus, the volume 211 may be viewed as a heterogenic volume, being composed of portions that have different traits. This heterogenic feature is supported by a mapping system 220 that maps each of at least some of the logical storage locations of the volume 211 to a corresponding physical storage location in underlying storage systems 230. In FIG. 2, each of the underlying storage systems 230 are illustrated as having a particular shape, which symbolizes a distinct trait set of the storage offered by the corresponding underlying storage system.

For instance, storage systems 230A and 230C are both illustrated as circles, representing that these storage systems provide storage having a common trait set. Storage systems 230B and 230E are illustrated as triangles, representing that these storage systems provide storage having a common trait set with each other, which trait set is different than that of storage systems 230A and 230C. Storage system 230D is shown as a trapezoid, representing that this storage system provides storage that has a trait set that is different than that of any of the other storage systems. Storage system 230F is shown as a square, representing that this storage system provides storage that has a further different trait set that is different than that of any of the other storage systems.

The underlying storage systems 230 are illustrated as including six storage systems 230A through 230F having four different trait sets (symbolically represented by the circle, the triangle, the trapezoid, and the square). However, the ellipses 230G represent that the underlying storage systems 230 may include any number of storage systems, whether more, whether equal to, or whether less than the number of storage systems illustrated in FIG. 2, so long as there are at least two storage systems that collectively offer storage having different trait sets. The mapping system 220 takes advantage of the different trait sets in order to offer up the heterogenic volume 211 to the file system.

At this point, some terminology will be described. In this description and in the claims, a "trait set" is described as a collection of one or more traits. Thus, a single trait may be considered to itself be a "trait set". Examples of traits of storage will be described in further depth below. Furthermore, when a storage system is described as offering storage having a trait set, that is not to say that there are not more traits beyond the trait set that are offered by the storage. Also, a given trait set (say a "first trait set") is "different than" another trait set (say a "second trait set") if the first trait set includes at least one trait that is not included in the second trait set, or if the second trait set includes at least one trait that is not included in the first trait set. Thus, there are cases in which the first trait set and the second trait set share one or more common traits, and yet they could still be different trait sets in accordance with this definition.

The term "physical" storage location or "physical" address will often be used to reference a storage location or address, respectively, in the underlying storage systems 230. This is done merely to distinguish the addressing scheme (i.e., "logical addressing scheme") used by the file system 201 when addressing the heterogenic volume 211 from the addressing scheme (i.e., "physical addressing scheme") used by the underlying storage system 230 to access storage offered by the corresponding underlying storage system. For instance, the file system 201 uses "logical" addresses to address the storage within the volume 211. However, the storage systems 230A through 230F use "physical" addresses to access the respective storage locations 231A through 231F.

However, this is not to imply that the underlying storage system is itself necessarily a physical device or system, although that may be the case. For instance, there may be one or more further levels of mapping abstraction that separate even the underlying storage system from the actual physical storage medium. As an example, the underlying storage system might be physical storage systems such as flash memory, solid-state disks, mechanical disks and so forth. However, the storage system might also be some type of consolidated storage system that offers up addresses that are mapped to further underlying storage systems. Furthermore, there may be one or more transforms (such as encryption or compression) that the storage system applies to the data prior to storing to a given storage location, and one or more reverse transforms (such as decryption or decompression) that the storage system applies to the data after reading data from the given storage location.

The clarification of definitions will now turn to granularity in the size of storage locations. In FIG. 2, the most refined illustrated granularity of storage locations (hereinafter referred to as a "slab") represents the basic unit that the mapping system 220 works with in order to map storage locations. Each slab represents contiguous address locations (e.g., contiguous logical blocks) in the logical addressing scheme recognized by the file system 201. In order to simplify the mapping 220, each slab may also represent contiguous address locations in the physical addressing scheme, although not strictly required.

For instance, in FIG. 2, the volume 211 is illustrated as including 17 slabs labeled as "A" through "Q". The exact number and size of the slabs in the volume is not critical to the principles described herein. Smaller slabs have the advantage of having more fine-grained control over the boundaries between storage of different trait sets in the volume, but have the disadvantage of increasing the number of mappings that the mapping system 220 keeps track of. Thus, the size of the slabs will be a design choice that depends on the balance of these advantages and disadvantages in the context of the specific implementation of the volume system 210. In one embodiment, the slabs are over one hundred megabytes. That may seem quite large, but if a volume is provided in the terabytes range, the mapping system 220 would still track numerous thousands of slab mappings. Thus, FIG. 2 represents a simplified system for the benefit of clearly explaining the principles described herein. Other selections for slab size might be a megabyte or above, although not required.

Having the slabs be of fixed size simplifies the mapping operation, although such is not required under the broader aspects described herein. For instance, a given slab might have a binary multiple of some constant in size. Suppose, for example, that the smallest slab (and thus the constant) is 100 megabytes. The mapping system might track slabs that are also 200 megabytes, 400 megabytes, 800 megabytes, 1.6 Gigabytes and so forth. Although this does increase the complexity of the mapping algorithm, it could also reduce the number of actual mappings that need to be tracked, while still allowing fine-grained control over the location of region boundaries.

Each of the physical storage locations 231A through 231F also have slabs that represent the basic unit of the mapping. For instance, in this example, physical storage locations 231A include slabs a1 through a4, physical storage locations 231B include slabs b1 through b3, physical storage locations 231C include slabs c1 through c4, physical storage locations 231D include slabs d1 through d6, physical storage locations 231E include slabs e1 through e3, and physical storage locations 231F include slabs f1 through f4. Of course, this example is greatly simplified for the benefit of the reader. Depending on the slab size, each underlying storage system 230 might more beneficially include hundreds, thousands, or even millions of slabs. Hereinafter, a slab in the volume 211 might also be referred to as a "volume slab", while a slab in the underlying storage system might also be referred to as a "storage slab".

A volume slab is "thickly provisioned" if the mapping system 220 maps that volume slab to a specific storage slab in the underlying storage system. For instance, volume slabs A through G are thickly provisioned as the mapping system 220 maps them to respective storage slabs a1, a3, a4, c2, b1, b3 and e3 in the underlying storage systems 230. Likewise, volume slabs L through Q are thickly provisioned as the mapping system 220 maps them to respective slabs d3, d1, d2, d4, d5 and d6 of the underlying storage systems 230.

A volume slab is "thinly provisioned" if the mapping system 220 does not map the volume slab to a specific storage slab in the underlying storage system until the volume slab is needed by the file system. For instance, volume slabs H through K are not mapped by the mapping system 220 to any underlying storage, although the mapping system 220 may be aware that storage slabs f1 through f4 of storage system 230F are available for proper mapping once any of the volume slabs H through K are actually used to store data.

In this description and in the claims, a "region" is defined as a set of one or more slabs that are contiguous in the logical addressing scheme of the volume (e.g., volume 211) presented to the file system (e.g., file system 201). For instance, volume 211 is illustrated as including first region 212A, second region 212B, third region 212C and fourth region 212D. However, the principles described herein are not limited to the number of regions within a volume, and an example will even be described further below in which the number of regions has increased.

Each region corresponds to a common trait set (also referred to as a "region trait set") that is "consistent with" the trait set offered by the underlying storage system(s) to which the constituent volume slabs are mapped. For instance, the first region 212A has a trait set (hereinafter referred to as a "first region trait set") that is consistent with the trait set of the supporting storage offered by the storage systems (e.g., 230A and 230C represented as circles) that have slabs that are mapped to the constituent volume slabs A through D. A region trait set is "consistent with" a storage trait set if the region trait set is either 1) the same as the storage trait set, or 2) a subset of the storage trait set with any excess traits offered by the underlying storage (beyond those in the region trait set) not being incompatible with any of the traits within the region trait set.

The second region 212B has a second region trait set that is consistent with the trait set of the supporting storage offered by the storage systems (e.g., 230B and 230E represented by triangles) that have slabs that are mapped to the constituent volume slabs E through G. The third region 212C has a third region trait set that is consistent with the trait set of the storage offered by the storage system 230F. Accordingly, the mapping system 220 is ready to map any of volume slabs H through K of region 212C to any of storage slabs f1 through f4 of storage system 230F (represented by a square) once a write operation is detected on the volume slabs H through K. The fourth region 212D has a fourth region trait set that is consistent with the trait set of the supporting storage offered by the storage system (e.g., 230D represented by a trapezoid) that have slabs that are mapped to the constituent volume slabs L through Q.

A region is defined as "thickly provisioned" if all of its constituent volume slabs are thickly provisioned. A region is defined as "thinly provisioned" if all of its constituent volume slabs are thinly provisioned. Thus, regions 212A, 212B and 212D are thickly provisioned, whereas region 212C is thinly provisioned in FIG. 2.

A "tier" is defined as a set of one or more regions having a common region trait set. A given region in the tier need not be contiguous with any other region within the tier. In the case of FIG. 2, each of the regions 212A through 212D have a different region trait set. There are no tiers in FIG. 2 which have more than one region. Accordingly, there are also four tiers in FIG. 2. A first tier includes only first region 212A and has a trait set (hereinafter referred to as a "first tier trait set") that is the same as the first region trait set. A second tier includes only second region 212B and has a trait set (hereinafter referred to as a "second tier trait set") that is the same as the second region trait set. A third tier includes only third region 212C and has a trait set (hereinafter referred to as a "third tier trait set") that is the same as the third region trait set. A fourth tier includes only fourth region 212D and has a trait set (hereinafter referred to as a "fourth tier trait set") that is the same as the fourth region trait set. In an example provided below with respect to FIG. 3, a fifth region (312E) is added in order to extend the first tier. However, for the description of FIG. 2, first through fourth regions correspond one-to-one to first through fourth tiers.

A tier is defined as "thickly provisioned" if its constituent region(s) is/are all thickly provisioned. A tier is defined as "thinly provisioned" if its constituent region(s) is/are thinly provisioned. Thus, the first, second and fourth tiers are thickly provisioned, whereas the third region is thinly provisioned. A tier might be thickly provisioned or thinly provisioned when initially set up in response to a provisioning instruction.

The file system 201 includes metadata 205 about the volume 211 such as the size of the volume, and the size and logical storage location(s) of each of the tiers. The metadata 205 might also include the tier trait set of each of the tiers. The metadata 205 may, for example, be persisted. The file system 201 may use this metadata 205 to make decisions regarding where to place a file system namespace (such as a directory or file), or a portion thereof, into the volume 211.

The ellipses 213 represent that the volume exposure system 210 may offer up more volumes to file systems. The additional volumes may also be heterogenic and may use the same underlying storage systems. For instance, in FIG. 2, the slabs a2, b2, c1, c3, c4, e1, e2, f1, f2, f3 and f4 are each illustrated as being unmapped in the case of there being only volume 211 that is being exposed up. Accordingly, these unmapped slabs are available to the volume exposure system 210 to construct one or more additional volumes (not shown) using the same principles described with respect to the construction of the first volume 211.

Any trait in any given trait set may be any trait that might have any relevance to a file system or other decision making logic in determining an effective tier in which to place a file system namespace (such as a directory or file system). Examples will now be provided, though this enumeration of examples is but a small sampling of possible relevant traits.

One example of a trait might be an actual type of underlying storage system. For instance, the type trait might specify flash memory, disk device, cloud storage, or any other type of storage system. The type trait might also specify broader categories such as solid state storage that involves no mechanically interacting pieces, or mechanism storage that has one or more mechanically interacting pieces.

A trait might also be a performant trait which relates to the performance of the storage. For instance, a read/write performant trait relates to the performance of the storage when performing read/write operations. For instance, read/write performant traits might be a function of latency (read and/or write), data transfer speed (read and/or write), or the like.

The performant trait might also be a transience performant trait, which might be a function of the likelihood that any given bit will flip in the storage over a given time period. For instance, the transience performant trait might indicate that the storage is capable of safely storing data for a certain number of days, weeks, or years. The transience performant trait might be a function of the number of expected write operations that a given size of storage can be expected to endure before subsequent writes are deemed unreliable or not possible. For instance, the storage might have a maximum of 10, 100 or 1000 write operations. The transience performant trait might also specify whether or not the storage is volatile or non-volatile.

A trait might be a resiliency trait that relates to a level of redundancy built into the storage. For instance, some storage might be 2-way mirrored, which is offered to survive failure of a single physical storage device. Some storage might have higher levels of redundancy surviving failure of more than one physical device, and the resiliency trait might specify a minimum level of redundancy.

The trait might also indicate whether or not the storage is remote-replicated, which involves keeping a copy of the data in a remote location.

A trait might also be related to an encryption property. For instance, the storage system might have hardware and/or software than encrypts data prior to storage, and decrypts the data after reading from storage, thus securely storing the data whilst allowing the file system to operate on the data in the clear. The encryption trait might also specify a minimum security of the encryption, such as whether 128 bit encryption is required.

The trait might also be a compression trait in which case the storage system has hardware and/or software to compress data prior to writing to storage, and decompress the data after reading from storage, thus storing the data in compressed form whilst allowing the file system to operate on the uncompressed data. The compression trait might also represent whether the compression must be lossless, or whether some level of lossy compression is acceptable, and if so, what level of lossy compression is acceptable.

A trait might also include the presence of absence of a seek penalty for the storage system. If a seek penalty is present, the trait might also specify characteristics of that seek penalty. A trait set might also include power consumption properties of the underlying storage.

A trait set for a given tier may include any one or more of these enumerated traits or additional traits not enumerated, or combinations thereof.

Figure 3:
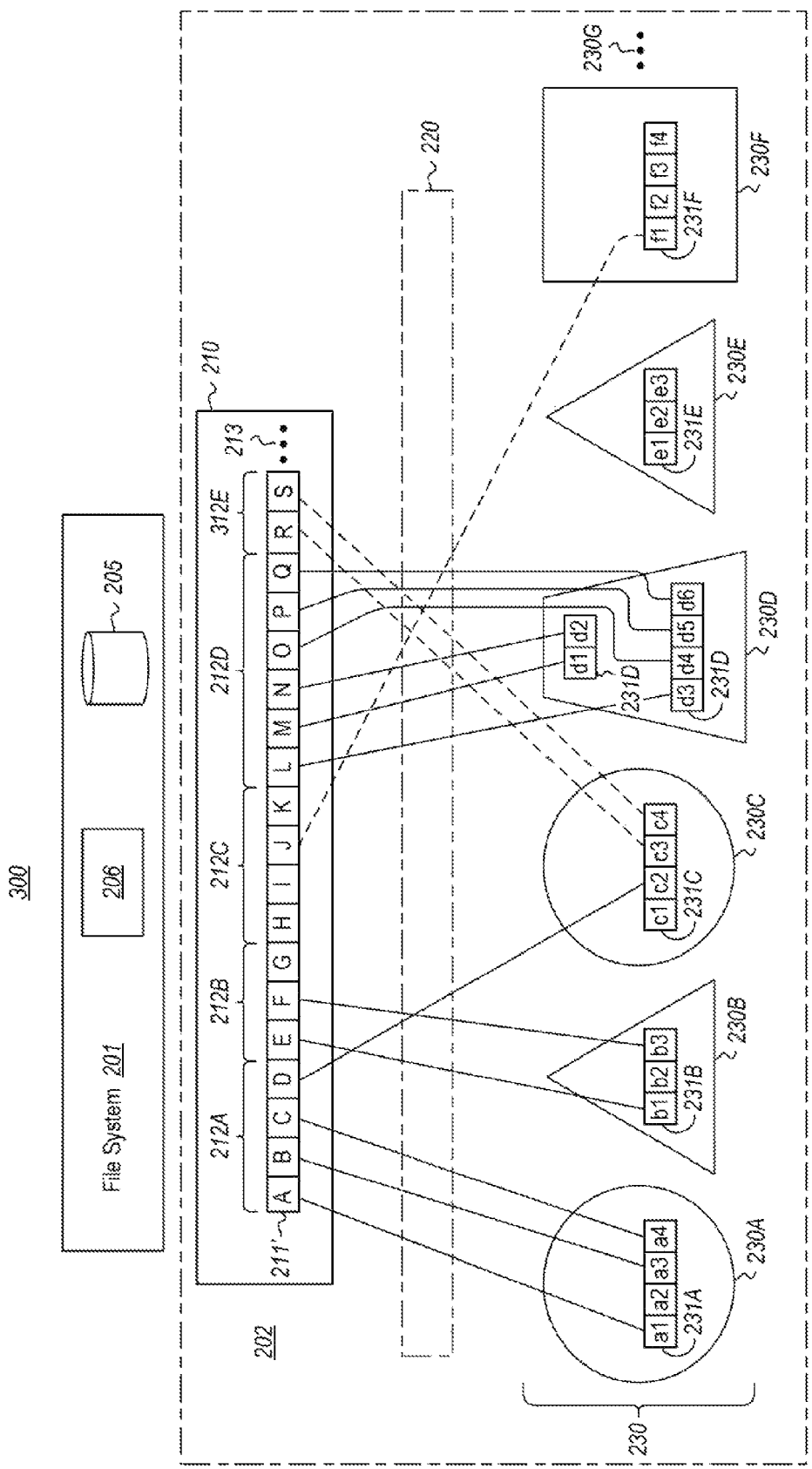
FIG. 3 illustrates a computing environment that is similar to the computing environment of FIG. 2, except that a volume slab that was thinly provisioned in FIG. 2 is now thickly provisioned, and in that the computing system extends the volume.

FIG. 3 illustrates an environment 300 that extends on the example of FIG. 2 and illustrates a number of happenings since the situation of FIG. 2. For one, the mapping system 220 now illustrates a mapping of volume slab J to storage slab f1. Thus, at some point, the file system 201 wrote to some logical address space within the slab J, causing the mapping system 220 to react by formulating an actual mapping to an underlying storage slab that supports the traits of the region 212C. Thus, in the state of FIG. 3, third region 212C, third tier, and volume 211' of FIG. 3 may be viewed as "partially thickly provisioned". A region, tier, or volume is "partially thickly provisioned" if there is at least one volume slab contained therein that is thickly provisioned, and at least one volume slab that is thinly provisioned.

Another happening is that the volume 211 of FIG. 2 has been extended by the volume exposure system 210 to form an extended volume 211' which includes a fifth region 312E having two volume slabs R and S. The fifth region 312E extends the first tier, previously including only first region 212A. Accordingly, now the first tier includes two regions 212A and 312E. If thick provisioning of the additional region is performed, the mapping system 220 responds to the instruction to extend the first tier by mapping the additional slabs R and S to respective storage slabs c3 and c4 of the storage system 230C that provides storage having a trait set that is consistent with the first tier trait set. Any tier in the volume can thus be extended through thick provisioning as long as there is compatible underlying storage available to support the extension.

This mapping operation results in any file system write operation to a logical address within a volume slab in the volume 211' being translated to a write request to the corresponding physical address in the corresponding mapped storage slab. If the volume slab is only thinly provisioned, the write request also results in the mapping of that volume slab to a consistent storage slab. If the file system issues a read operation for a logical address within a volume slab in the volume 211', the mapping results in the read request from the corresponding physical address in the corresponding mapped storage slab.

Accordingly, the volume system 202 is an effective mechanism for providing a heterogenic volume to the file system, allowing intelligent decision making to appropriately place file system namespaces (such as directories or files) or even portions of files in an appropriate tier of the namespace. The appropriate trait set for a given file system namespace, or portion thereof, may change in response to dynamic conditions, resulting in the file system moving the file system namespace, or portions thereof, from tier to tier so long as trait guarantees for that file system namespace are honored. While the file system 201 may operate on any heterogenic volume that has multiple tiers of different storage traits, regardless of how that heterogenic volume has been generated, an embodiment of the file system operation will now be described with respect to FIGS. 4A, 4B and 5 with reference to the example volume 211 of FIG. 2, and with respect to the example extended volume 211' of FIG. 3.

Figure 4A:
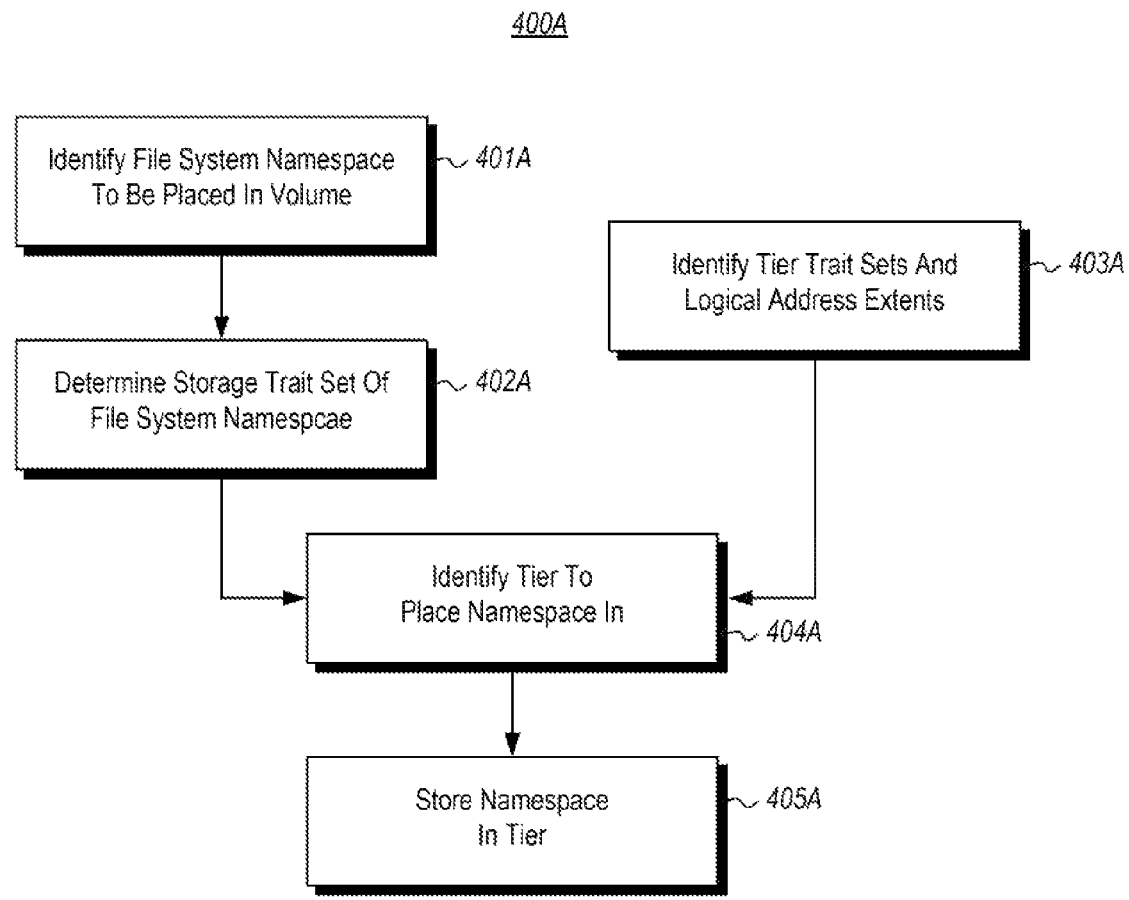
FIG. 4A illustrates a flowchart of a method for the file system to operate to place a file system namespace into a volume.

FIG. 4A illustrates a flowchart of a method 400A for operating a file system to place a file system namespace in a volume based on a current state of trait sets to be applied to the file system namespace. For instance, the method 400A may be performed by the file system 201 of FIG. 2 on the volume 211 of FIG. 2, and/or on the volume 211' of FIG. 3.

The method 400A includes an act of identifying a file system namespace to be placed in the volume (act 401A). The file system namespace could be, for example, a directory or file. For instance, this identification (act 401A) might occur when a file system namespace is to be written to the volume.

The method 400A also includes determining a storage trait set corresponding to the file system namespace (act 402A), or in other words, determining a storage trait set to be applied to the file system namespace when placing the file system namespace into the volume. For instance, in an example provided herein (hereinafter referred to as the "subject example"), suppose that the file system namespace is a file that has just been created, and that the file is to be encrypted, and optionally compressed. The file system would thus determine that an encryption storage trait is to be applied to the file in storage, and an optional compression trait is to be optionally applied to the file in storage.

The storage trait set to be applied to any given file system namespace may be determined in response to user input. For instance, the user might expressly state a desired storage trait, and perhaps whether the desired storage trait is mandatory or optional. For instance, in the subject example, suppose the user stated that the file is to have a mandatory storage trait of encryption and an optional compression storage trait.

The user might also express more general goals for the file system namespace. For instance, in the subject example, perhaps the user specified that the primary goal of storage is to keep the information in the file from being discovered, but also expressed a secondary goal to keep the size of the file below a certain threshold. Based on these stated goals, and given the size of the uncompressed file, the file system (or some logic accessible to the file system) may assign the mandatory encryption storage trait and the optional compression storage trait to the file.

The file system also identifies a trait set and logical address extent for each of the tiers within the volume (act 403A). For instance, as previously described with respect to FIGS. 2 and 3, the file system is provided with metadata 205 either in a push fashion (such as when the volume is created or extended) and/or in a pull fashion (e.g., in response to a query from the file system 201 to the volume system 202 when a volume is created or extended). The act of identifying the trait set and logical address extend for each tier (act 403A) is shown in parallel with the identifying of a file system namespace (act 401A) and its associated trait set (act 402A), because the metadata 205 may be acquired by the file system 201 at any time, even perhaps well before the file system namespace is identified.

There are a number of different ways that the trait set for each tier may be represented in the metadata 205. In one embodiment, the trait set is expressly enumerated for each tier. In another embodiment, some inheritency is employed to represent the trait set in a more compressed form. For instance, based on inheritency rules, a particular tier might inherit traits from volume level traits.

Using this information, the file system 201 (or logic accessible to the file system 201) may then identify the particular tier of the volume into which to store the file system namespace (act 404A). This may be performed based on matching the storage trait set of the file system namespace with trait sets of identified tiers (act 404A) to find all those tiers for which there are consistent trait sets with the storage trait set of the file system namespace.

For instance, consider again the subject example in which the storage trait set of a file to be stored includes a mandatory encryption storage trait, and an optional compression storage trait. Now suppose the first tier (corresponding to first region 212A in FIG. 2, or both regions 212A and 312E in FIG. 3) provides encryption and compression, and the second tier (corresponding to region 212B in FIGS. 2 and 3) provides encryption only. Both the first and second tiers would then have trait sets that are compatible with the trait set of the file system namespace. In this case, the file system would choose the first tier to store the file into.

Consider again the subject example in which there is only one tier which provides encryption (but not compression), and only one other tier offers compression (but not encryption). In that case, the file system might choose the tier that provides encryption (but not compression) since encryption is a mandatory trait of the file, and compression is only an optional trait of the file.

Consider a final example in which there are no tiers that perform encryption. However, recall that in the subject example, the encryption storage trait is a mandatory storage trait. In this case, the file system might respond to such a failure by performing any appropriate action such as 1) notifying the user that file storage has failed, and requesting whether to change the traits or goals for the file, or 2) saving the file in the best matched tier, but notifying the user of the suboptimal storage, and requesting whether the storage should be cancelled.

One possible methodology for finding a best matched tier is as follows, although the principles described herein are not limited to any particular mechanism for finding a tier that matches the trait set for a file. According to this example methodology, the trait set of the file (the "file trait set") is compared against the trait set offered by the tier (the "tier trait set"). If there is an exact match between the file trait set and the tier trait set, with no additional trait offered in the tier trait set, that that tier is selected as the target for the file. If no such tiers exist, then the tier is selected that is an exact match between the file trait set and the tier trait set, but with the fewest additional traits offered in the tier trait set. In case of a tie, the tier with the most available blocks is selected.

If there is not an exact match between the file trait set and the tier trait set, the tier with the most matching tier traits is selected, which tier has no additional trait offered in the tier trait set. If no such tier exist, then the tier is selected that has the most matching tier traits, but with the fewest additional traits offered in the tier trait set. Again, in case of a tie, the tier with the most available blocks is selected.

The goal of a best match algorithm is not only to provide a good matching tier in which to place the file, but also to provide predictable behavior. The motivation behind choosing an exact match with the fewest amount of additional tier traits would be to choose a tier that will have the most predictable behavior based on the desired file trait set. For example, if a volume had two tiers, one with the no seek penalty trait, and another with the no seek penalty trait and an encryption trait, but the file only requires the no seek penalty trait, then it may be best to choose the tier with only the no seek penalty trait, since encryption requires significant processing and might diminish the performance benefit sought by the no seek penalty trait.

Once an appropriate tier for storing the file system namespace is found (act 404A), the file system 201 causes the file system namespace to be stored in the appropriate tier (act 405A).

Figure 4B:
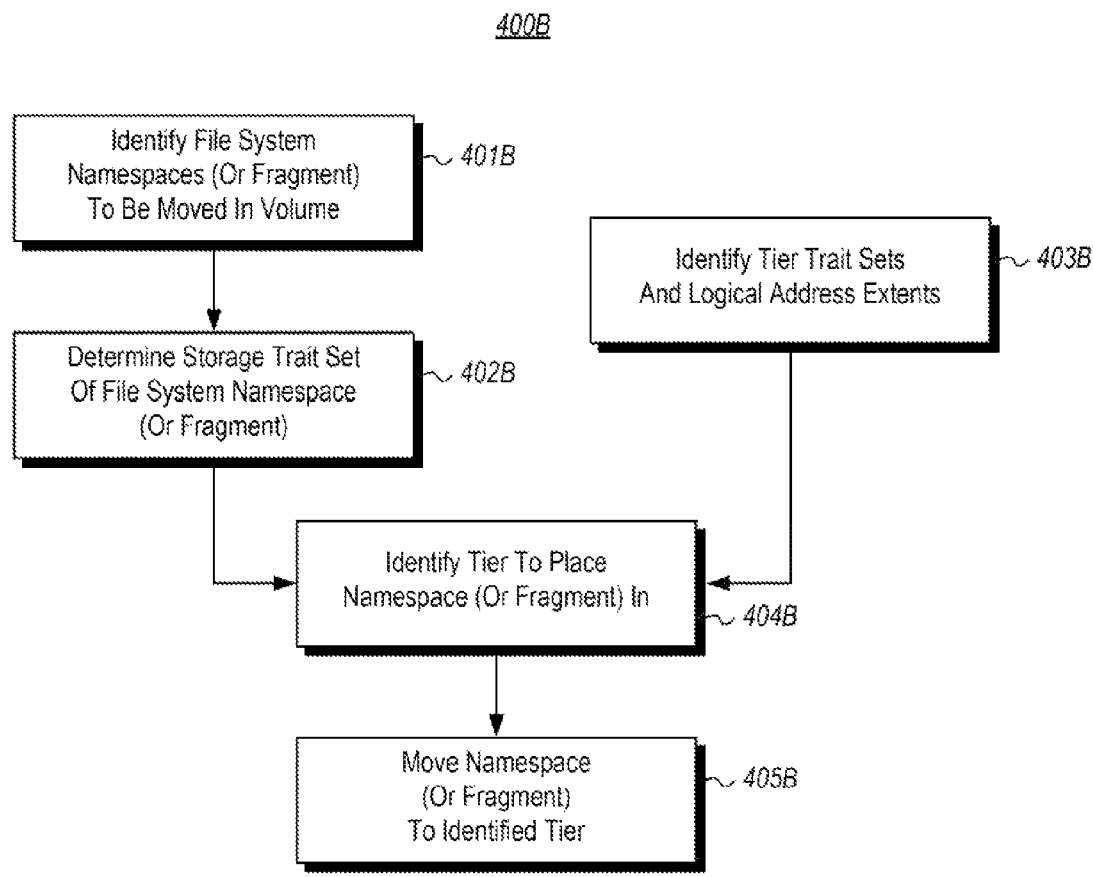
FIG. 4B illustrates a flowchart of method for the file system to operate to move a file system namespace (or fragment thereof) within the volume.

FIG. 4B illustrates a flowchart of a method 400B for operating a file system to move a file system namespace from one tier to another in a volume based on a current state of trait sets to be applied to the file system namespace. Some of the acts within method 400B are quite similar to the acts of method 400A. Again, the method 400B may be performed by the file system 201 of FIGS. 2 and 3.

The method 400B includes an act of identifying a file system namespace to be moved (act 401B). The file system namespace could be, for example, a directory or file. In some embodiments, a portion of a file system namespace might be moved in the volume. The method 400A also includes determining a storage trait set corresponding to the file system namespace (act 402B), which may be performed in a similar manner to the act 402A of FIG. 4A. The file system also identifies a trait set and logical address extent for each of the tiers within the volume (act 403B), which may be similar to act 403A of FIG. 4A. Using this information, the file system 201 (or logic accessible to the file system 201) may then identify the particular tier of the volume into which to move the file system namespace (act 404B) based on matching the tier trait set with the file system storage trait set. The file system 201 then causes the file system namespace to be moved to the identified tier (act 405B).

This moving operation may occur for any of a number of reasons even if the trait set of the file system namespace had not changed. In a first example, suppose that a volume slab had to be removed from a tier, and the file system namespace was placed wholly or partly within that volume slab. This might occur if, for example, a storage system that supported the volume slab malfunctions, and the system elects not to remap the volume slab to another storage slab in a different storage device that also supports that tier (e.g., because there was no such other storage system available). In that case, the file system namespace may be moved to another acceptable tier.

Another reason for movement might be that an additional tier comes available, which additional tier has a corresponding trait set that more closely matches the trait set to be applied to the file system namespace. For instance, in the subject example, recall that the trait set of the file was a mandatory encryption trait and an optional compression trait. Suppose that the file was initially stored into a tier that offers encryption, but not compression, because there simply was no tier available at that time that offered both encryption and compression. Now, suppose the volume is extended to add a new tier in which both encryption and compression are offered, and there is plenty of room in that new tier. The file system namespace may then be moved to achieve encryption and compression of the file system namespace.

Figure 5:
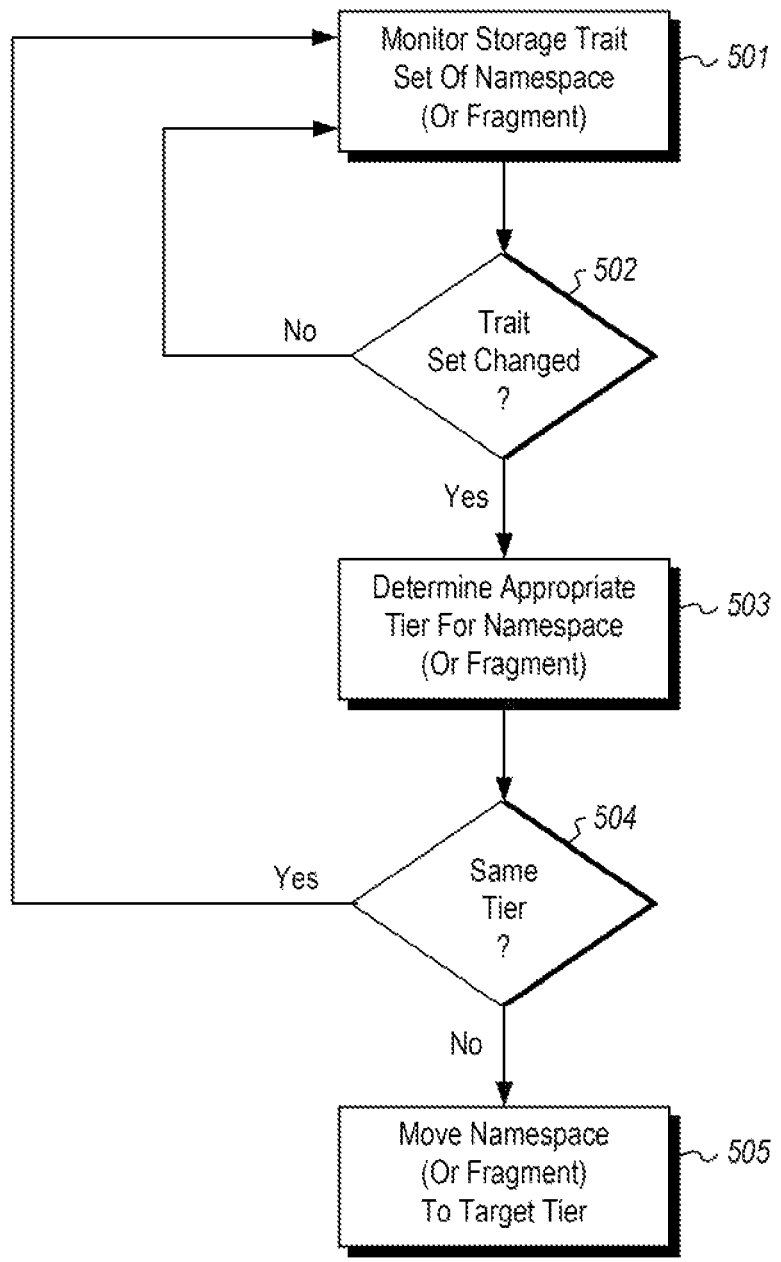
FIG. 5 illustrates a flowchart of a method for a tier engine to move a file system namespace (or fragment thereof) based on dynamically changing traits of the file system namespace or fragment thereof.

Other movements of file system namespaces (of fragments) may be in response to dynamic changes in the storage trait set to be applied to the corresponding file system namespace (or fragment). Accordingly, the file system 201 also includes a tier engine 206 that monitors file system storage trait sets dynamically. The tier engine 206 is capable of moving at the granularity of a portion of a file in response to one or more of the trait sets of the file segment changing. Thus, a file system namespace portion or fragment might inherit the trait set of the file system namespace that it is part of, but may also take on additional traits that are not inconsistent with that file system namespace. FIG. 5 illustrates a flowchart of a method 500 for moving a file system namespace or portion thereof in the volume in response to changing traits to be applied to the file system namespace (or fragment thereof).

The tier engine monitors the trait set (act 501) of the file system namespace (or fragment thereof). If the trait set has not changed ("No" in decision block 502), the tier engine performs no movement and monitoring continues (act 501). If the trait set does change ("Yes" in decision block 502), the tier engine then determines the most appropriate tier to which to move the file system namespace (or fragment thereof) (act 503). This may be performed in a very similar manner as for acts 404A and 404B based on matching the trait set of the file system namespace (or fragment thereof) to each tier trait set. If the best tier is the same tier that the file system namespace (or fragment thereof) is presently located in ("Yes" in decision block 504), no movement is performed. Instead the tier engine continues monitoring (act 501). If the best tier for the file system namespace (or fragment thereof) is a different tier than the file system namespace (or fragment thereof) is currently in ("No" in decision block 504), the tier engine causes the file system namespace (or fragment thereof) to be moved to the target tier (act 505). The tier engine may perform this monitoring continuously, periodically, and/or in response to events for multiple file system namespaces and multiple fragments.

Accordingly, a file system has been described that can effectively use a multiple tier volume in which each tier has different traits. Initial assignment of a file system namespace into a tier, and/or subsequent movement of the file system namespace (or fragment thereof) within the tier may be intelligently performed advantageously using the trait sets offered by each of the tiers within the volume.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising one or more computer-readable hardware storage device having thereon one or more computer-executable instructions that are executable by one or more processors of a computing system to cause the computing system to perform acts comprising:
   an act of acquiring logical storage locations and trait sets for each of a plurality of tiers of a volume;
   an act of identifying a file system namespace that is either in the volume or that is to be placed in the volume;
   an act of determining a storage trait set corresponding to the file system namespace;
   an act of identifying a trait set of a particular tier of the volume;
   an act of identifying the particular tier of the volume into which to store the file system namespace, wherein said identifying includes:
      determining that the storage trait set fails to match any set of traits corresponding to the plurality of tiers of the volume, including the trait set of the particular tier; and
      selecting the particular tier as a best matched tier; and
   an act of causing the file system namespace to be stored within the particular tier of the volume.

2. The computer program product in accordance with claim 1, wherein the file system namespace is a file.

3. The computer program product in accordance with claim 1, wherein the file system namespace is a directory.

4. The computer program product in accordance with claim 1, wherein the act of identifying a file system namespace comprises an act of creating a file system namespace within the volume.

5. The computer program product in accordance with claim 4, wherein the storage trait set comprises a static trait set.

6. The computer program product in accordance with claim 1, wherein the storage trait set comprises at least one dynamic trait set, the method further comprising an act of monitoring the dynamic trait set to determine that the dynamic trait set has changed, wherein an act of identifying a tier of the volume into which to store the file system namespace, and the act of causing the file system namespace to be stored within the identified tier of the volume are both performed in responses to the monitored change in the dynamic trait set.

7. The computer program product in accordance with claim 1, wherein the act of determining a storage trait set corresponding to the file system namespace is based at least in part on user input.

8. The computer program product in accordance with claim 7, wherein the user input is an expression of one or more mandatory traits for the file system namespace.

9. The computer program product in accordance with claim 7, wherein the user input is an expression of one or more optional traits for the file system namespace.

10. The computer program product in accordance with claim 7, wherein the user input is an expression of one or more user goals for the file system namespace.

11. The computer program product in accordance with claim 1, wherein the act of identifying a trait set of a particular tier of the volume comprises the following:
   an act of identifying at least one trait that is expressly associated with the particular tier;
   and an act of identifying at least one trait that is inherited by the particular tier from the volume.

12. The computer program product in accordance with claim 1, wherein the trait set of the particular tier comprises a performant trait.

13. The computer program product in accordance with claim 1, wherein the trait set of the particular tier comprises a resiliency trait.

14. The computer program product in accordance with claim 1, wherein the trait set of the particular tier comprises an encryption property.

15. The computer program product in accordance with claim 1, wherein the trait set of the particular tier comprises a compression property.

16. The computer program product in accordance with claim 1, wherein the trait set of the particular tier comprises at least one of a transience property or a write-limitation property.

17. The computer program product of claim 1, wherein the acts further include:
   an act of determining the particular tier has a fewest quantity of additional traits among all other trait sets of the plurality of tiers.

18. A computer-implemented method comprising:
   an act of acquiring logical storage locations and trait sets for each of a plurality of tiers of a volume;
   an act of identifying a file system namespace that is either in the volume or that is to be placed in the volume;
   an act of determining a storage trait set corresponding to the file system namespace;
   an act of identifying a trait set of a particular tier of the volume;
   an act of identifying the particular tier of the volume into which to store the file system namespace, wherein said identifying includes:
      determining that the storage trait set fails to match any set of traits corresponding to the plurality of tiers of the volume, including the trait set of the particular tier; and
      selecting the particular tier as a best matched tier; and
   an act of causing the file system namespace to be stored within the particular tier of the volume.

19. The method of claim 18, wherein the method further includes notifying the user of the failed match.

20. The method in accordance with claim 18, wherein the method further includes an act of identifying a trait set for each of the plurality of tiers within the volume by querying the volume for a logical location of the plurality of tiers and the trait sets for each of the plurality of tiers.

21. The method in accordance with claim 20, wherein the act of querying the volume is performed during an act of mounting the volume to the file system.

22. A computing system comprising:
   at least one processor; and
   underlying storage;
   the computing system implementing a file system that operates on a volume that comprises a plurality of tiers of the volume to the file system, each of the plurality of tiers corresponding to a trait set of the underlying storage, the computing system having modules for operating a file system, including the following:
      a module for acquiring logical storage locations and trait sets for each of a plurality of tiers of a volume;
      a module for identifying a file system namespace that is either in the volume or that is to be placed in the volume;
      a module for determining a storage trait set corresponding to the file system namespace;
      a module for identifying a trait set of a particular tier of the volume;
      a module for identifying the particular tier of the volume into which to store the file system namespace, wherein said identifying includes:
         determining that the storage trait set fails to match any set of traits corresponding to the plurality of tiers of the volume, including the trait set of the particular tier; and
         selecting the particular tier as a best matched tier; and
      a module for causing the file system namespace to be stored within the particular tier of the volume.

* * * * *